A. J. RHOADES.
ART OF PUFFING CEREAL GRAINS.
APPLICATION FILED APR. 9, 1914.
1,227,002.
Patented May 22, 1917.
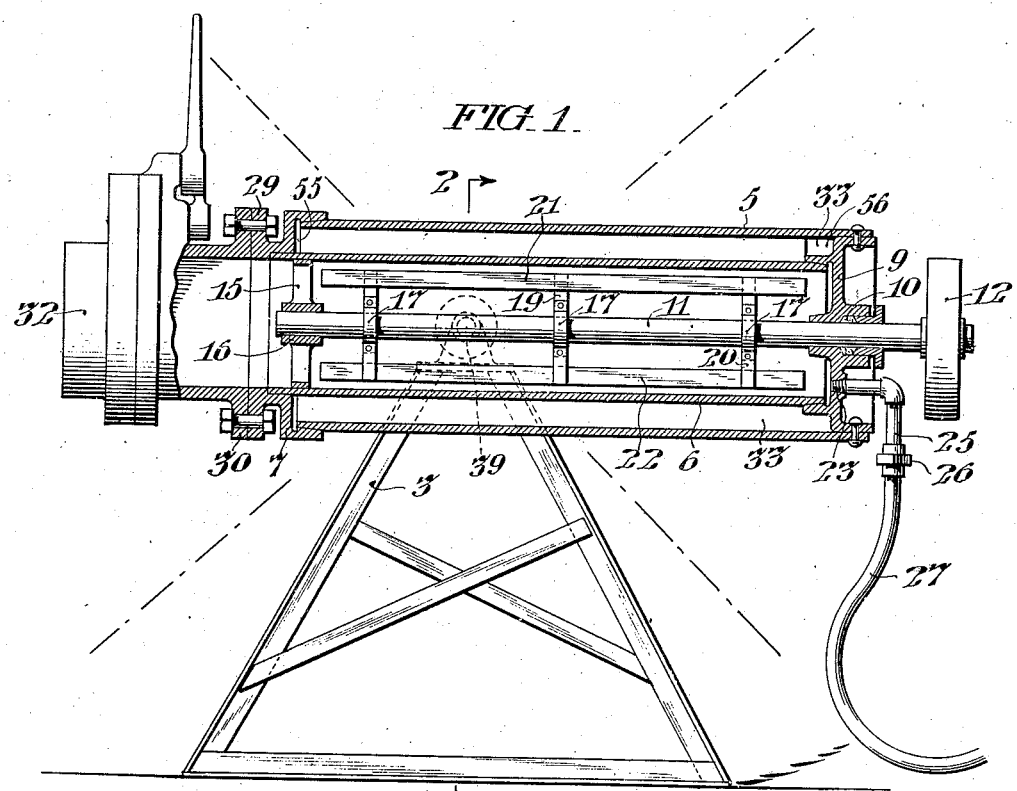
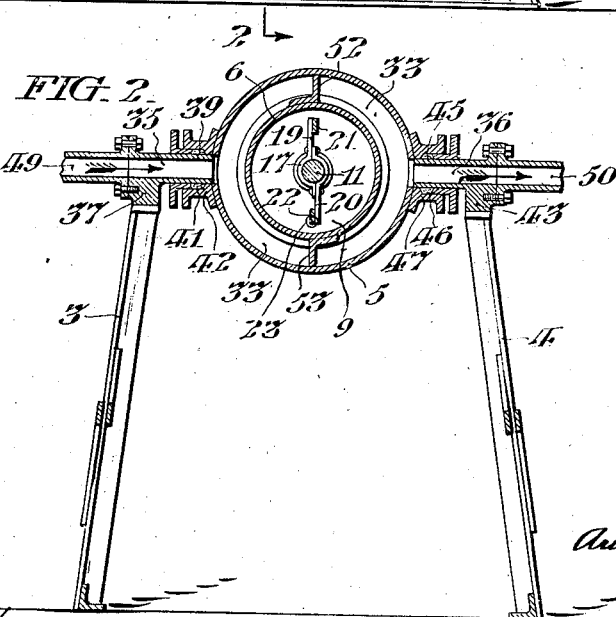

UNITED STATES PATENT OFFICE.

ARTHUR J. RHOADES, OF PHILADELPHIA, PENNSYLVANIA.

ART OF PUFFING CEREAL GRAINS.

1,227,002.   Specification of Letters Patent.   Patented May 22, 1917.

Application filed April 9, 1914. Serial No. 830,836.

*To all whom it may concern:*

Be it known that I, ARTHUR J. RHOADES, a citizen of the United States, and a resident of Philadelphia, county of Philadelphia, and State of Pennsylvania, have invented certain new and useful Improvements in the Art of Puffing Cereal Grains, of which the following is a specification, reference being had to the accompanying drawings.

My invention relates particularly to mechanism for producing puffed cereal grains and includes the method of operating the same.

The principal objects of my invention are to provide simple and efficient mechanism for effecting the puffing of cereal grains, which will greatly facilitate the puffing operation and consequently reduce the cost of production; to provide mechanism embodied in a unitary structure in which the successive steps incident to the puffing operation may be completed; and to provide means for maintaining a uniform temperature within the chamber in which the grains are contained during the process of treatment.

Other objects of my invention are to provide mechanism for puffing cereal grains, wherein the heating element is formed in unitary relation with the grain container and whereby said container may be tilted upon a stationary axis to be charged and discharged; to provide means within said grain container for agitating the grain under treatment; to provide means for introducing steam under pressure within said container; and to provide means for quickly releasing said pressure.

Specifically stated my invention comprehends mechanism for puffing cereal grains, comprising a tiltable jacketed grain container having a space for the circulation of heated fluid, an inlet and an outlet for said fluid, means for directing the heated fluid toward the ends of said container; and means for injecting steam under pressure into said container.

My invention further includes all of the various novel features of construction and arrangement of the parts and the method of operating the same as hereinafter more definitely specified.

In the accompanying drawings Figure 1 is a partial longitudinal sectional view of a machine constructed in accordance with my invention and conveniently adapted for puffing cereal grains; and Fig. 2 is a transverse vertical sectional view of the machine shown in Fig. 1, taken on the line 2—2 in said figure.

In said figures, 3 and 4 are suitably trussed standards for pivotally supporting the grain puffing mechanism, which comprises the exterior jacket 5 concentrically embracing the grain container 6. Said jacket 5 and container 6 are connected in fluid tight relation at one end by the ring 7, and at the other end by the head 9, which is provided with a suitable stuffing box 10 through which the shaft 11 having the driving pulley 12 extends. Said shaft 11 extends through the container 6 and is rotatably supported at its inner end by the spider 15 which provides a bearing 16 therefor.

The shaft 11, carries a plurality of winged collars 17, having oppositely disposed wings 19 and 20 which respectively carry the paddles 21 and 22 extending parallel with the axis of the shaft 11 and in closely adjacent relation with the inner surface of the grain container, so as to agitate the grains contained therein during the heating process.

The head 9 is provided with the threaded aperture 23 into which the threaded end of the steam pipe 25 is engaged. Said pipe 25 may be connected by the union 26 with the flexible pipe 27 leading from any suitable source of steam pressure, the flexible pipe being arranged to permit the tilting of the grain container in a vertical plane as hereinafter described.

The ring 7 is provided with the end flange 29 to which is bolted the opposed flange 30 of the quick opening valve 32, which may be of any well known construction adapted to effect the quick release of the pressure within said grain container.

The annular chamber 33 between the concentric tubular walls of the container 6 and its jacket 5 is provided for the circulation of a suitable fluid such as heavy oil heated to the desired temperature for treating the grains in the container 6.

As best shown in Fig. 2 the heated oil may be injected into the chamber 33 through the inlet 35 and discharged therefrom through the outlet 36. The inlet 35 is formed in the fitting 37 which is carried by the standard 3, and which includes the hollow trunnion 39 extending through the stuffing-box 41 in the rotatable bearing 42 which projects laterally from the cylindrical wall of the jacket 5. The outlet 36 is formed in the fitting 43 which is carried by the standard 4, and which includes the hollow trunnion 45 extending through the stuffing-box 46 in the rotatable bearing 47 which projects from the cylindrical wall of the jacket 5 diametrically opposite to the bearing 42 and in axial alinement therewith.

The fittings 37 and 43 may be respectively connected with the inlet and outlet of a suitable fluid heated by the pipes 49 and 50 which direct the circulation of heated fluid to and from the chamber 33 as indicated by the arrows therein.

In order to insure a uniform heating of the container throughout its length, the chamber 33 is divided longitudinally by diametrically opposite baffled webs 52 and 53 which are substantially coextensive with said chamber, but which terminate slightly short of its ends and thereby afford suitable end passageways 55 and 56 for the passage of heated oil from that portion lying to the right of said plane as viewed in Fig. 2.

It will be readily seen that the container and its associated mechanism may be tilted upon the trunnions 39 and 45 from the horizontal position shown in Fig. 1 to the charging position shown by the dot and dash line which extends upwardly toward the valved end of said container, or to the discharging position shown by the dot and dash line which extends downwardly toward said valved end.

Although the shaft 11 is described as being provided with a driving pulley 12 it is to be understood that other driving means may be substituted for said pulley such as spur or worm gearing which may be readily disconnected from the driving elements, for the purpose of permitting the container to be rocked into either its charging or discharging positions above described.

The operation of the mechanism above described is comparatively simple and may be effected as follows:

The valve 32 being opened the container is tilted to raise the valved end to such position as to readily receive the grain and then it may be tilted to its horizontal position shown in Fig. 1 and its valve closed, whereupon the shaft 11 is rotated to agitate the grain while the hot oil of suitable temperature is circulated through the surrounding chamber 33. When the grain being treated is heated to a uniform temperature, superheated steam of suitable pressure according to the kind of grain may be introduced into the container through the steam pipe 25, and said pressure maintained for a brief period, when said steam may be shut off, whereupon the container, still under pressure may be tilted to the discharging position, and the valve opened to suddenly release said pressure and to permit the grain to be discharged.

It may be readily seen that my invention is highly advantageous in that a uniform temperature may be maintained in the container, and that no furnace is required, the container being operated by tilting it upon a stationary axis, thereby eliminating the cumbersome operation of inserting it into and withdrawing it from a furnace.

I do not desire to limit my invention to the precise details of construction and arrangement herein set forth as it is obvious that various modifications may be made therein without departing from the essential features of my invention as defined in the appended claims.

Having thus described my invention, I claim:

1. A container for cereal grains having a fluid tight jacket, provided with an inlet and an outlet oppositely disposed in transverse relation to the longitudinal axis of said container for admission and discharge of heated fluid, and having means interposed between said inlet and outlet for directing said fluid longitudinally therethrough in opposite directions.

2. A container for cereal grains having means for introducing steam under pressure, a fluid tight jacket for the circulation of a heated fluid around said container, and having means for directing said fluid longitudinally therethrough, and means rotatable in the container for agitating the contents of said container.

3. A container for cereal grains, having means for introducing steam under pressure, a fluid tight jacket for the circulation of a heated fluid around said container, means rotatable in said container for agitating the contents thereof, and means tiltably supporting said container upon an axis transverse to the axis of the agitating means, and affording an inlet and an outlet for said heated fluid.

4. A container for cereal grains, comprising a tubular body having means for introducing steam under pressure into the grain chamber, a jacket forming a chamber surrounding said body for the circulation of a heated fluid, and tubular supports upon which said container may be tilted in the plane of its longitudinal axis and providing means for introducing a heated fluid into said jacket.

5. A container for cereal grains, comprising a tubular body having means for introducing steam under pressure into the grain chamber, a quick opening valve for suddenly releasing said pressure and for discharging the treated grains, a fluid tight jacket forming a chamber surrounding said body for the circulation of a heated fluid, and a support for said container, having hollow trunnions forming an inlet and an outlet for the jacketed chamber, and upon which said container is arranged to be tilted longitudinally.

6. A container for cereal grains comprising a tubular body having means for introducing steam under pressure into the grain chamber, a quick opening valve for suddenly releasing said pressure and for discharging the treated grains, a fluid tight jacket concentric with said body and forming a chamber surrounding said body for the circulation of a heating medium, baffle webs extending longitudinally in the jacketed chamber, a support for said container, having hollow trunnions forming an inlet and an outlet for the jacketed chamber, and suitable stuffing boxes on said jacket rotatably connecting said jacket and trunnions in fluid tight relation.

7. A container for cereal grains comprising a tubular body having means for introducing steam under pressure into the grain chamber, a quick opening valve for suddenly releasing said pressure and for discharging the treated grains, a fluid tight jacket concentric with said body and forming a chamber surrounding said body for the circulation of a heating medium, baffle webs extending longitudinally in the jacketed chamber, a support for said container, having hollow trunnions forming an inlet and an outlet for the jacketed chamber, and suitable stuffing boxes on said jacket rotatably connecting said jacket and trunnions in fluid tight relation and a shaft rotatable in said container and having a plurality of longitudinal paddles for agitating the contents thereof.

8. A container for cereal grains having a fluid tight jacket provided with an inlet and an outlet, a rotatable agitating means, mounted to rotate in said container on its longitudinal axis and supports for said container upon which it is tiltably mounted on an axis transverse to the axis of the said agitating means and affording an inlet and an outlet for said jacket.

9. A container for cereal grains having means for introducing steam under pressure, a fluid tight jacket for the circulation of the heated fluid around said container and having means for directing said fluid longitudinally therethrough and causing it to flow to the ends of said container and means for agitating the contents of said container.

In testimony whereof I have hereunto set my hand in the presence of two subscribing witnesses.

ARTHUR J. RHOADES.

Witnesses:
    STANLEY W. ROOT,
    GEORGE P. YARD.